(12) United States Patent
Nagatani

(10) Patent No.: US 6,249,354 B1
(45) Date of Patent: Jun. 19, 2001

(54) IMAGE PROCESSING APPARATUS AND METHOD

(75) Inventor: Masahiro Nagatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/023,410

(22) Filed: Feb. 13, 1998

(30) Foreign Application Priority Data

Feb. 14, 1997 (JP) .................................................. 9-030537

(51) Int. Cl.$^7$ .............................. G06K 15/02; G06K 9/38; H04N 1/407
(52) U.S. Cl. ........................... 358/1.9; 358/530; 358/455; 382/252
(58) Field of Search ............................... 348/34; 358/1.13, 358/1.14, 1.15, 501, 534, 536, 1.9, 530, 455, 456, 458, 298; 382/252

(56) References Cited

U.S. PATENT DOCUMENTS

| | | | |
|---|---|---|---|
| 4,739,397 | * 4/1988 | Hayashi et al. | 382/252 |
| 4,958,236 | * 9/1990 | Nagashima et al. | 358/450 |
| 4,975,786 | * 12/1990 | Katayama et al. | 358/450 |
| 4,998,165 | * 3/1991 | Lindstrom et al. | 348/34 |
| 5,521,989 | * 5/1996 | Fan et al. | 382/252 |
| 5,534,915 | * 7/1996 | Sandrew et al. | 348/34 |
| 5,625,755 | * 4/1997 | Shu et al. | 358/536 |
| 5,708,728 | * 1/1998 | Nomura et al. | 358/534 |

* cited by examiner

*Primary Examiner*—Scott Rogers
(74) *Attorney, Agent, or Firm*—Fitzpatrick, Cella, Harper & Scinto

(57) ABSTRACT

Image quality is improved when monochrome printing by using an image processing method having a monochrome printing mode and a color printing mode for reproducing a gray image using a plurality of colors in a case where the monochrome printing mode is set. The image processing method includes the steps of inputting gray image data, converting the gray image data into color image data composed of a plurality of color components, performing a quantization process to the color image data, and performing an error diffusion process for distributing a quantization error of the color image data to peripheral pixels of an objective pixel in accordance with a direction set for each of the color components.

6 Claims, 7 Drawing Sheets

FIG. 4A

ERROR DISTRIBUTION WINDOWS IN CASE OF PROC IN "→" DIRECTION

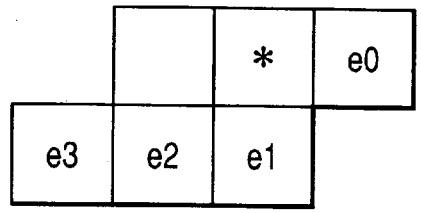

FIG. 4B

ERROR DISTRIBUTION WINDOWS IN CASE OF PROC IN "←" DIRECTION

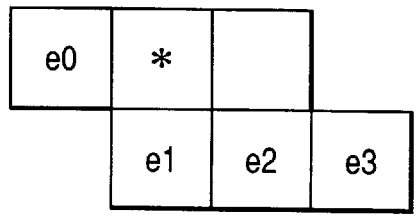

FIG. 5A

EXAMPLE OF ERROR DISTRIBUTION COEFFICIENT IN A CASE WHERE RESOLUTION IN MAIN SCAN DIRECTION IS IDENTICAL WITH THAT IN SUB SCAN DIRECTION

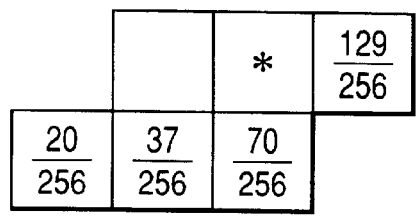

FIG. 5B

EXAMPLE OF ERROR DISTRIBUTION COEFFICIENT IN A CASE WHERE RESOLUTION IN MAIN SCAN DIRECTION IS TWICE AS MUCH AS RESOLUTION IN SUB SCAN DIRECTION

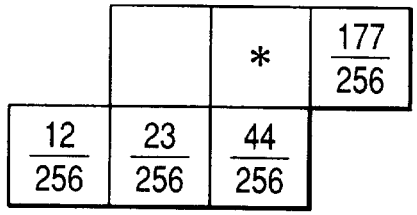

IMAGE PROCESSING APPARATUS AND METHOD

BACKGROUND OF THE INVENTION

1. Field of the Invention

The present invention relates to an image processing apparatus and method, and more particularly to color processing in a monochrome printing mode.

2. Related Background Art

Conventionally, a color printer having inks of C, M, Y and K (cyan, magenta, yellow and black) performs printing using the C, M, Y and K inks in a case where color printing is designated. Further, in a case where monochrome printing is designated, the printing has been performed using only black ink as shown in FIG. 3.

However, if the printing is performed using only black ink in monochrome printing, there sometimes occurs remarkable graininess in a low-density portion. In this case, image quality is deteriorated as compared with a case where gray data is printed using the color inks. Further, even if the printing is performed using only black ink, sometimes the black subtly becomes reddish or bluish depending on a medium characteristic.

SUMMARY OF THE INVENTION

The present invention has been made in consideration of the above-mentioned problems, and an object thereof is to improve image quality in monochrome printing.

To attain the above-mentioned object, the present invention is characterized by an image processing method having a monochrome printing mode and a color printing mode for reproducing a gray image using a plurality of colors in a case where the monochrome printing mode is set, comprising the steps of:

inputting gray image data;

converting the gray image data into color image data composed of a plurality of color components;

performing a quantization process to the color image data; and performing an error diffusion process for distributing a quantization error of the color image data to peripheral pixels of an objective pixel in accordance with the direction set for each of color components.

Further, the present invention is characterized by an image processing method having a monochrome printing mode and a color printing mode for reproducing a gray image using a plurality of colors in a case where the monochrome printing mode is set, comprising the steps of:

inputting gray image data;

converting the gray image data into color image data composed of a plurality of color components;

performing a color processing to the color image data; and forming an image on the basis of the color processed color image data.

Other objects and features of the present invention will become apparent from the following embodiments and the attached drawings.

BRIEF DESCRIPTION OF THE DRAWINGS

FIGS. 4A and 4B indicate error distribution windows of an error distribution table;

FIGS. 5A and 5B indicate error distribution coefficients;

DETAILED DESCRIPTION OF THE PREFERRED EMBODIMENTS

Figure 1:
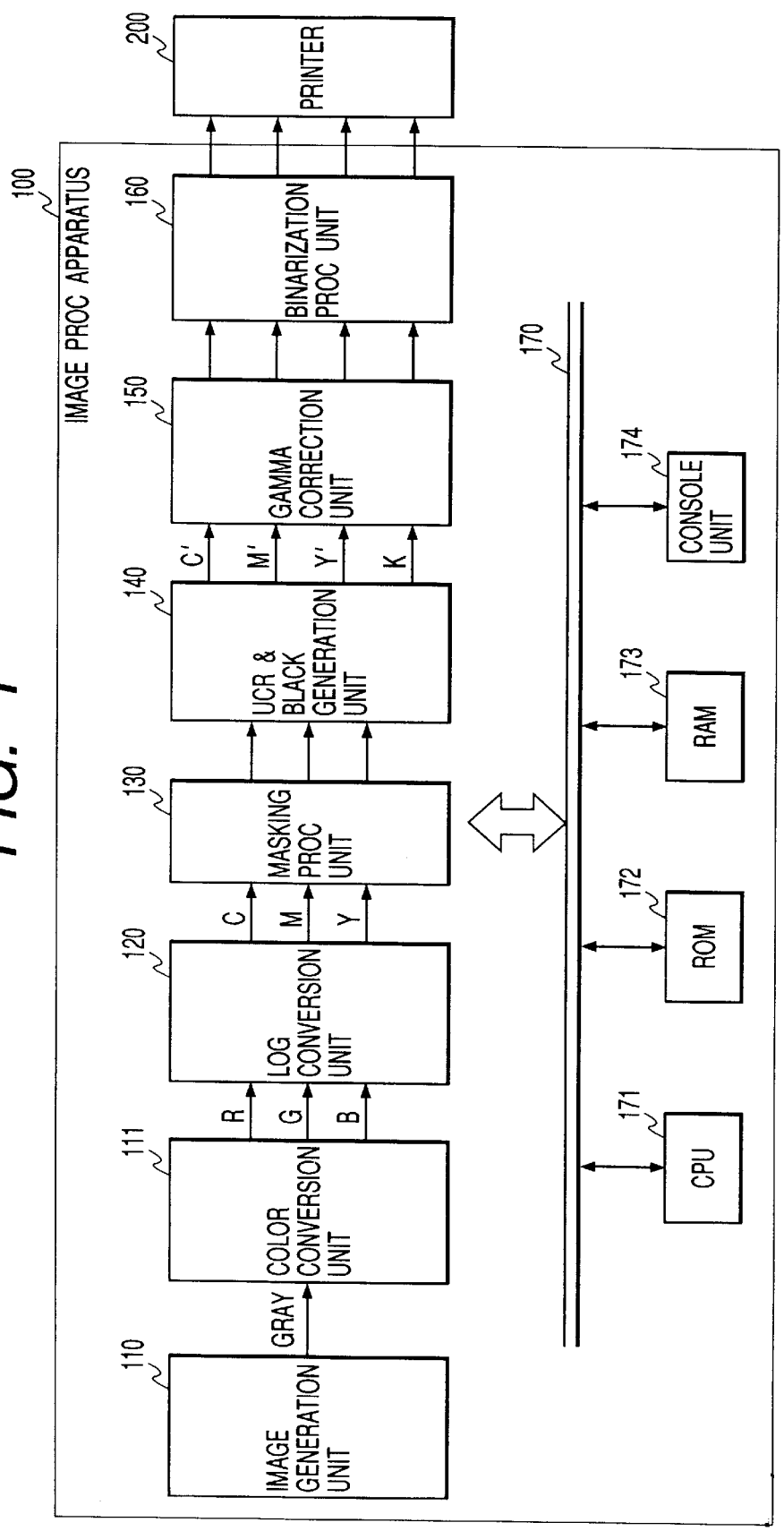
FIG. 1 is a block diagram for explaining a color processing in a monochrome printing.

FIG. 1 is a block diagram for explaining the structure of an image processing apparatus concerning the embodiments to which the present invention is applied, wherein a color printing process is performed even if monochrome printing is designated.

An image processing system is composed of an image processing apparatus 100 and a printer 200. Such instruments as a monitor, a scanner or the like may be connected to the image processing apparatus 100.

First, a description will be given as to the image processing apparatus 100.

A flow of a process, which is executed under the control of a CPU 171 through a CPU bus 170 by using a RAM 173 as a work memory based on a program stored in a ROM 172 in the image processing apparatus 100 in a case where the monochrome printing is designated at a console unit 174, will be described hereinafter.

Image data indicated by gray eight-bit data is first generated in a image generation unit 110 by an application or the like. A color conversion unit 111 converts the gray eight-bit data into R, G and B eight-bit data (R=G=B).

A LOG conversion unit 120 performs a luminance density conversion for R, G and B image data to output C, M and Y image data.

A masking process unit 130 performs a color correction using a matrix calculation based on the characteristics of inks used in the printer 200.

A UCR and black generation unit 140 performs a UCR process and a black generation process described later to the inputted C, M, and Y image data for generating C', M', Y' and K image data.

A gamma correction unit 150 performs a gradation correction process to each component.

A binarization processing unit 160 binary processes each image data indicated by a multi-value to each component of inputted C, M, Y, and K using a dither process and an error diffusion process described later in accordance with each color.

The printer 200 forms an image on a recording sheet by an ink jet recording system using heads provided for each component of C, M, Y and K and recording material (ink).

More particularly, recording is performed by moving a recording head, in which a plurality of nozzles are arranged in sub-scanning direction, in a main scanning direction. When the recording of one line is terminated, a recording medium is moved in the sub-scanning direction to return the recording head to a next starting portion for recording, then a next line is recorded. Thereafter, a serial recording system, which performs the recording of one page by the same procedure, is used.

In this embodiment, the ink jet recording system for forming an image using four colors of C, M, Y and K inks is described as an example. However, due to the recent tendency to use low-cost manufacturing, a printer utilizing a system become available for forming an image using three colors of C, M and Y inks excepting the K ink, a recording technique is proposal for representing gray by superimposing three colors of C, M and Y inks.

Also, in the ink jet recording system for forming an image using four colors of C, M, Y and K inks, as a method for improving a reproducibility of color in a low density portion such as a skin color or the like, the recording technique is proposal for representing gray by superimposing three colors of C, M and Y in a low density portion and increasing the density of the K ink as increasing the density.

The image processing apparatus concerning the present invention is not limited to the ink jet recording system but may be an electrophotographic system which can perform a multi-value recording.

Also, the apparatus may be a recording system using a head which discharges ink droplets by utilizing film boiling caused by heat energy.

Figure 2:
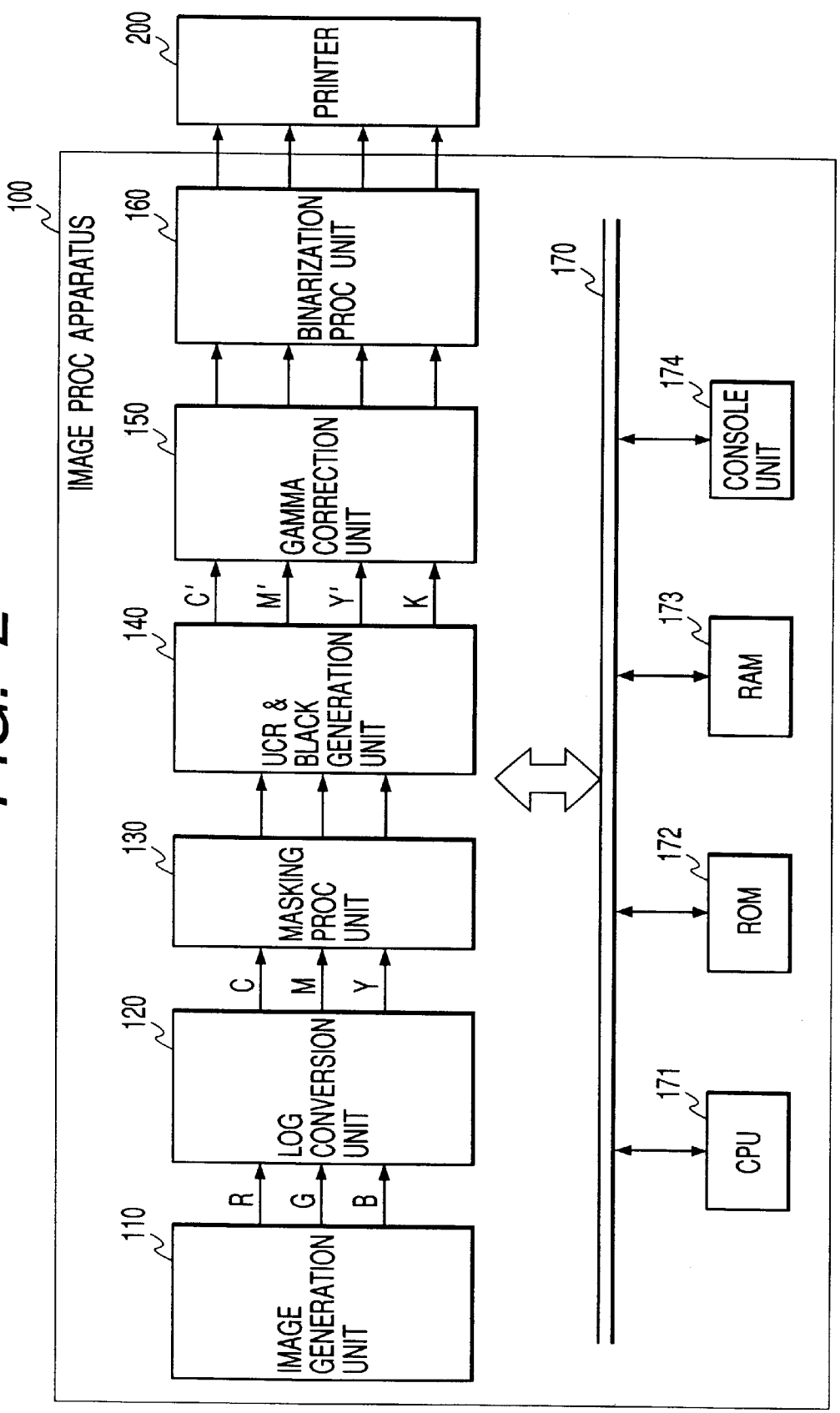
FIG. 2 is a block diagram for explaining a color processing in a color printing.

Next, a flow of a process in the image processing apparatus 100 in a case where a color printing is designated at the console unit 174 will be described with reference to FIG. 2. Since the process is the same as that for monochrome printing, the description will be omitted.

In the color printing process, the R, G and B eight-bit data is generated in the image generation unit 110 to be outputted to the LOG conversion unit 120. Thereafter, each color processing is performed in the same manner as that of the monochrome printing to output the data to the printer 200.

An example of the error diffusion process executed in the binarization processing unit 160 will be explained hereinafter.

Figure 3:
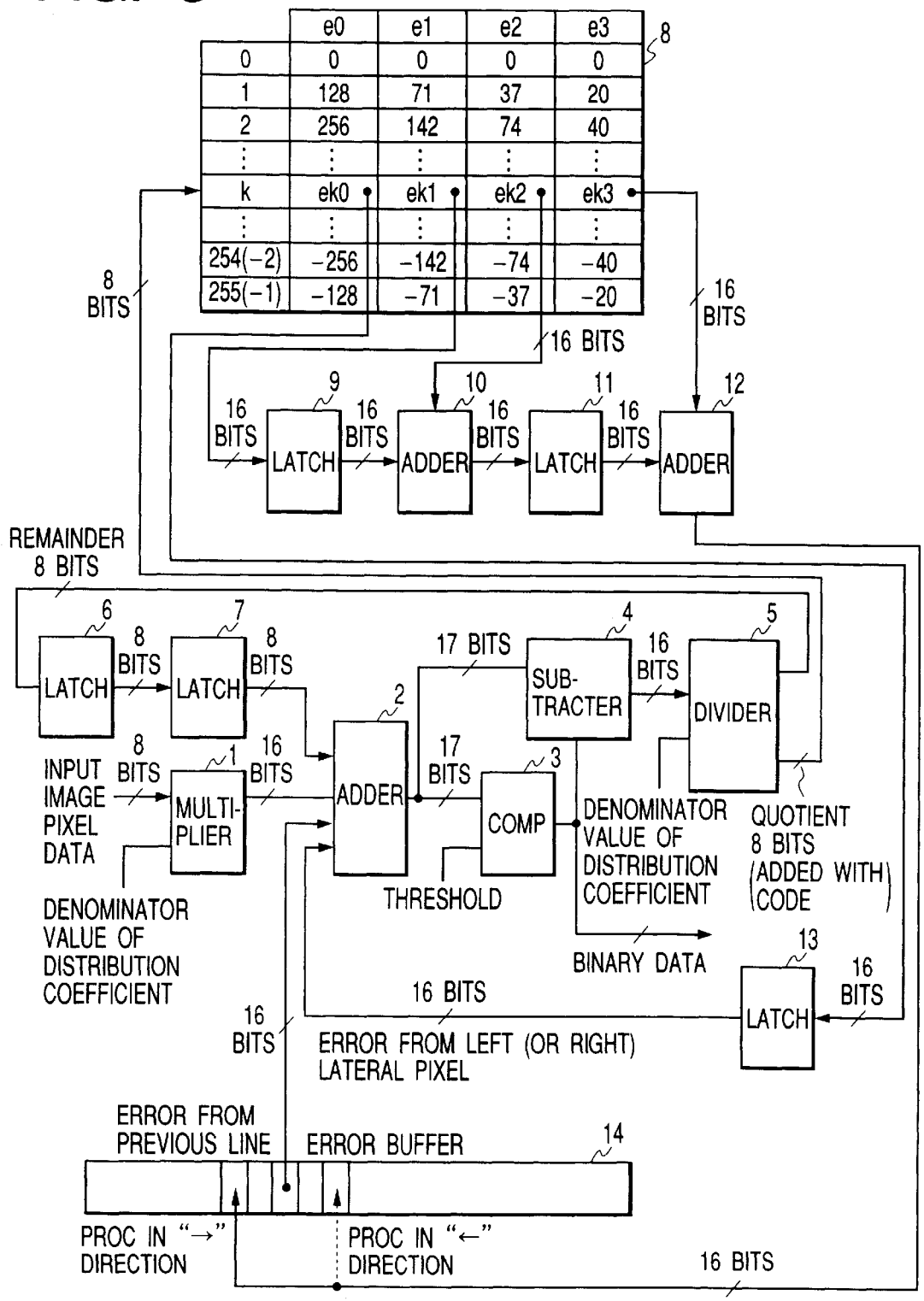
FIG. 3 is a detailed block diagram of the process unit 160 of FIG. 2.

FIG. 3 is a block diagram indicating the constitution of a binarization processing circuit for a certain color component of the binarization processing unit 160. The binarization processing unit is composed of a multiplier 1, adders 2, 10 and 12, a comparator 3, a subtracter 4, latches 6, 7, 9, 11 and 13, an error distribution table 8 and an error buffer 14.

Input image pixel data inputted to the multiplier 1 from the left side in FIG. 3 is eight-bit multi-value image data.

The multiplier 1 multiplies the input image pixel data by a denominator value of an error distribution coefficient. FIGS. 5A and 5B indicate the error distribution coefficients. FIG. 5A indicates the error distribution coefficients in a case where resolution in main scanning direction is identical with resolution in sub scanning direction. FIG. 5B indicates the error distribution coefficients in a case where the resolution in main scanning direction is twice as much as the resolution in sub scanning direction. In this embodiment, as the denominator value of the error distribution coefficient is 256, the value of the input image pixel data multiplied by 256 is outputted from the multiplier 1 to be inputted to the adder 2.

The adder 2 adds the input image pixel data multiplied by 256 (denominator value of error distribution coefficient), a rounding error outputted from the latch 7, an error from a previous line read from the error buffer 14 and an error from the left or right lateral pixel outputted from the latch 13. Data outputted from the adder 2 is inputted to the comparator 3.

The comparator 3 compares a value of data from the adder 2 with a predetermined threshold value (127 in this embodiment). At this time, if the data outputted from the adder 2 is greater than the threshold value, a value 1 is outputted and if it is not greater than the threshold value, a value 0 is outputted to produce binary data.

The data outputted from the adder 2 and data outputted from the comparator 3 are inputted to the subtracter 4 to subtract the latter data from the former data. Since the data outputted from the adder 2 is 17-bit and the data outputted from the comparator 3 is one-bit, the latter data is bit-expanded in the subtracter 4 to calculate a binarization error E indicated as 255 when the value is 1 and as 0 when the value is 0.

The binarization error E calculated in the subtracter 4 is inputted to a divider 5 to be divided by the denominator value of the distribution coefficient. As a result, a quotient is obtained as an integer which becomes a reference value for the error distribution table 8. On the other hand, a remainder becomes the rounding error, the absolute value of which is less than 1, is inputted to the latch 6.

The latches 6 and 7 distribute the rounding error to outside of pixels indicated by the error distribution table 8 for re-inputting it to the adder 2 after assigning of the delay corresponding to two pixels.

The error distribution table 8, to which the quotient outputted from the divider 5 is inputted as the reference value, is composed of a look-up table of a RAM (random access memory) or a ROM (read only memory). The value multiplied by a denominator value of a predetermined weighted coefficient for every value of the binarization error E is stored in the error distribution table 8.

FIGS. 4A and 4B indicate error distribution windows of the error distribution table 8. The values corresponding to the error distribution windows are stored in the error distribution table 8. Since each value is multiplied by a denominator value of the error distribution coefficient in accordance with the value of the binarization error E, each value is expressed by an integer unit of 16 bits. In this embodiment, although two symmetrical error distribution windows are used by switching every two rasters in accordance with the processing direction, it is sufficient to prepare one error distribution table 8 because of the symmetrical error distribution windows.

Each of four values of ek0, ek1, ek2 and ek3 outputted from the error distribution table 8 in accordance with the value of binarization error k corresponds to each value of e0, e1, e2 and e3 of the error distribution window shown in FIG. 3 respectively. Therefore, the output ek0 is inputted to the latch 13 to be re-inputted to the adder 2 after performing the delay for one pixel.

The output ek1 is inputted to the latch 9 to be inputted to the adder 10 after performing the delay for one pixel and is added to the output ek2. Further, an output from the adder 10 is inputted to the latch 11 to be inputted to the adder 12 after performing the delay for one pixel and is added to the output ek3. Then, an output from the adder 12 is written in the error buffer 14.

Figure 6:
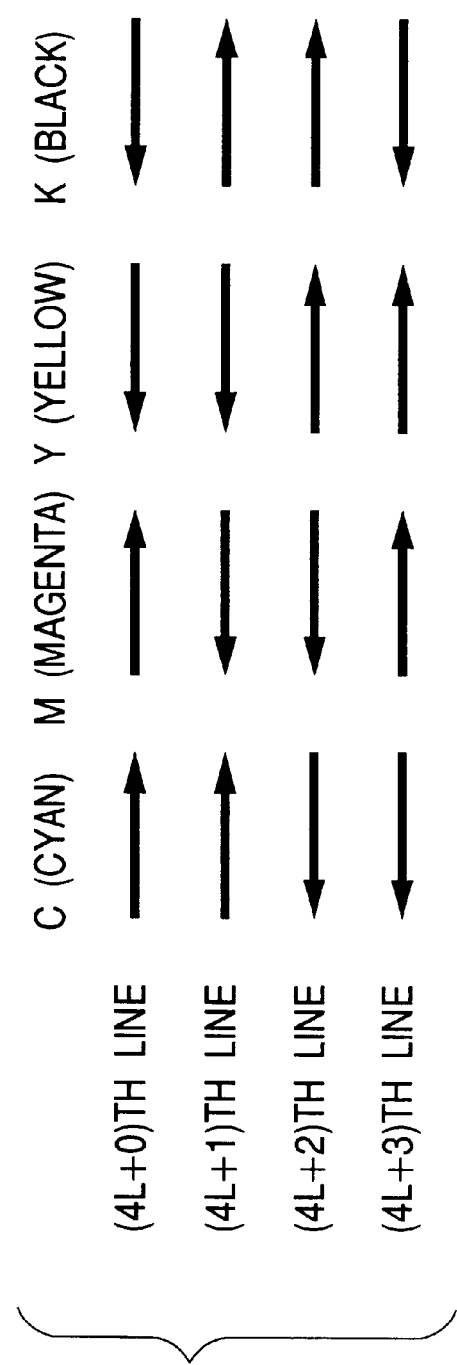
FIG. 6 indicates a direction of an error diffusion process.

In the present embodiment, a portion where the error is written has a distance of two pixels from the left or right of an objective pixel depending on the direction of an error diffusion process. FIG. 6 indicates the direction of the error diffusion process.

The direction of the error diffusion process is to be switched every two rasters in case of four colors of C, M, Y and K (three colors of C, M and Y) as shown in the below.

C (cyan) of (4L+0)th line is binarized from the left to the right.

M (magenta) of (4L+0)th line is binarized from the left to the right.

Y (yellow) of (4L+0)th line is binarized from the right to the left.

K (black) of (4L+0)th line is binarized from the right to the left.

C (cyan) of (4L+0)th line is binarized from the left to the right.

M (magenta) of (4L+0)th line is binarized from the right to the left.

Y (yellow) of (4L+0)th line is binarized from the right to the left.

K (black) of (4L+0)th line is binarized from the left to the right.

C (cyan) of (4L+2)th line is binarized from the right to the left.

M (magenta) of (4L+2)th line is binarized from the right to the left.

Y (yellow) of (4L+2)th line is binarized from the left to the right.

K (black) of (4L+3)th line is binarized from the left to the right.

C (cyan) of (4L+3)th line is binarized from the right to the left.

M (magenta) of (4L+3)th line is binarized from the left to the right.

Y (yellow) of (4L+3)th line is binarized from the left to the right.

K (black) of (4L+3)th line is binarized from the right to the left.

wherein L=0, 1, 2, 3, . . . , and the color designation of C, M, Y and K may be changed.

Figure 7:
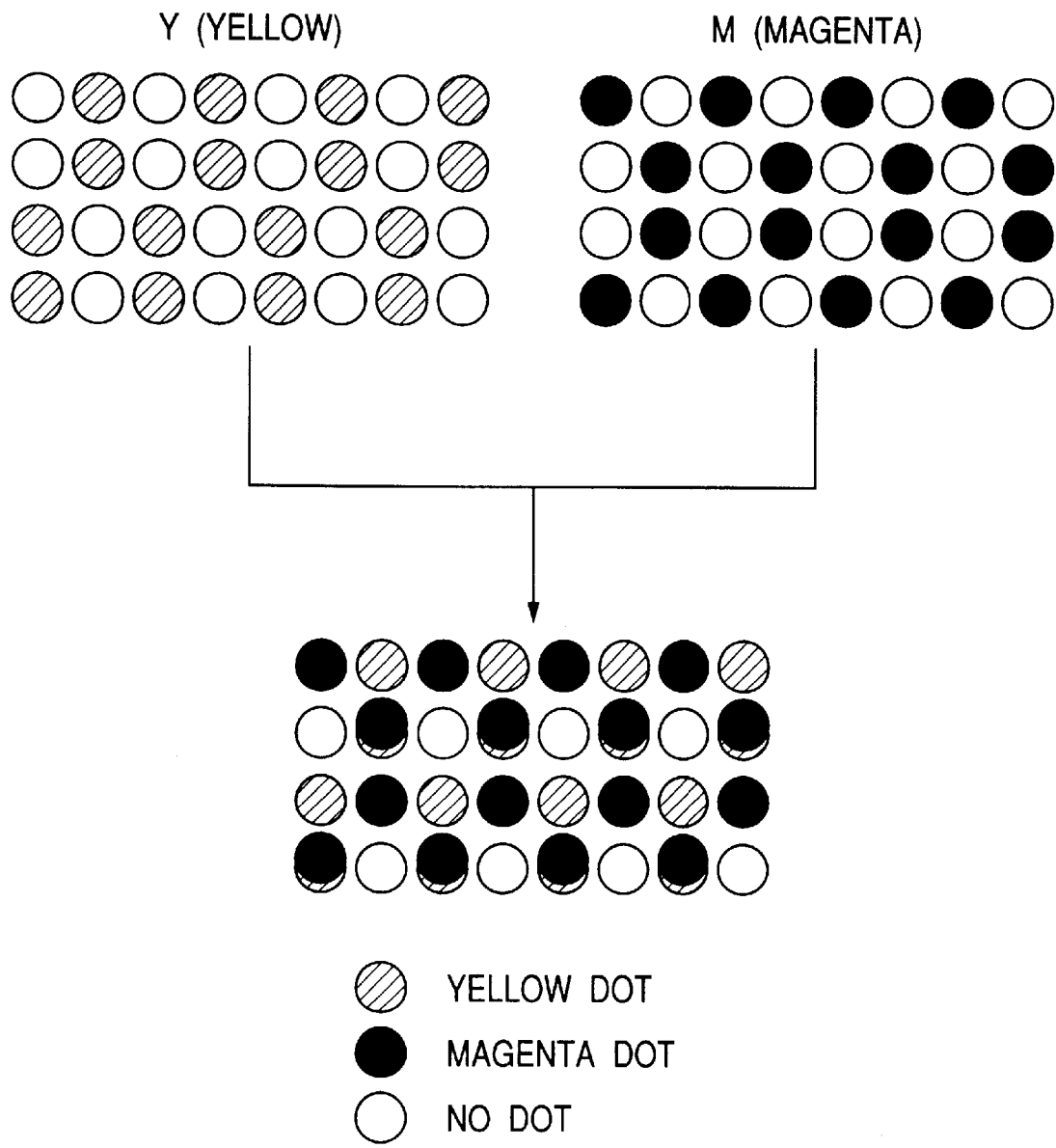
FIG. 7 indicates a case for forming red color using M (magenta) and Y (yellow) of the same value.
Figure 8:
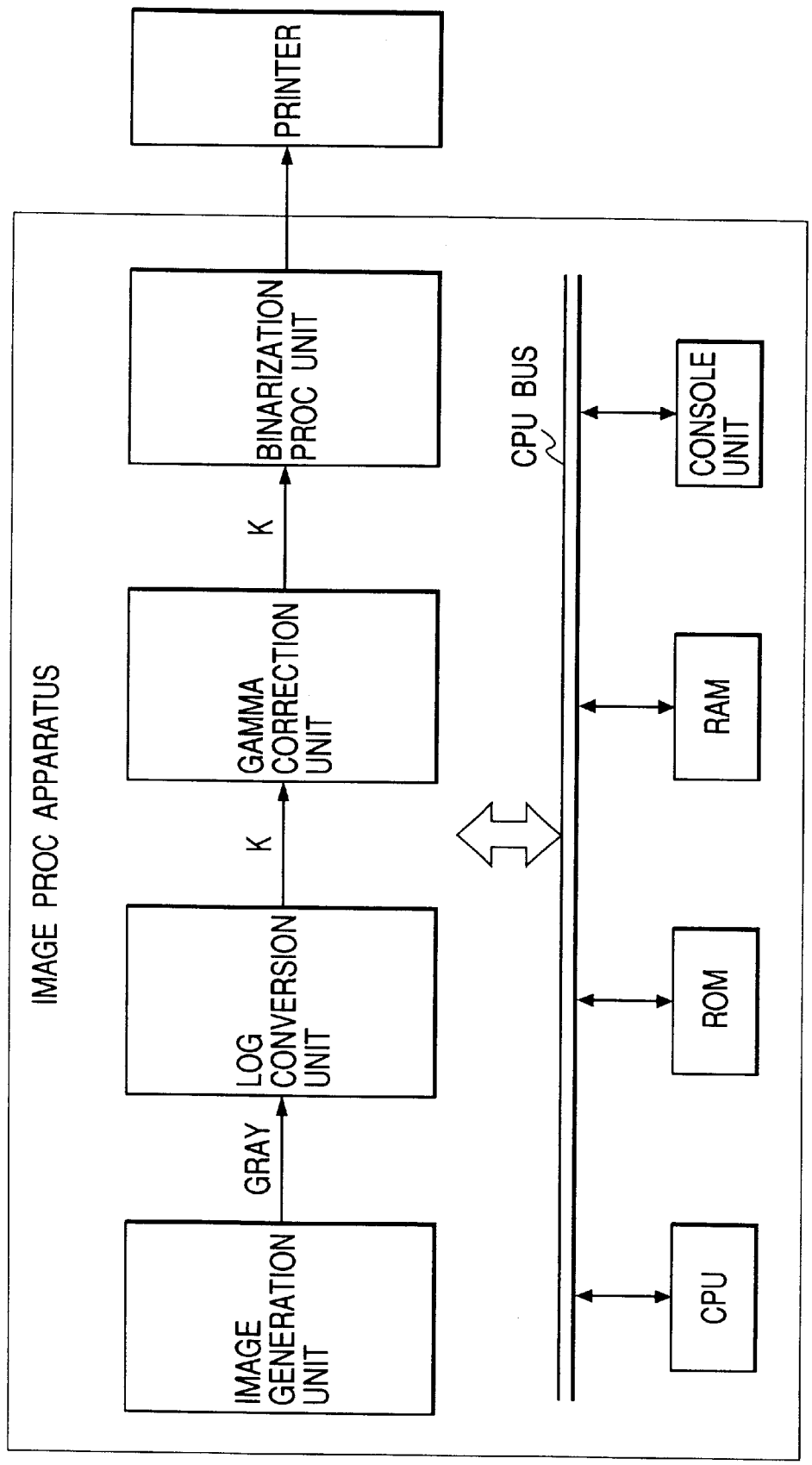
FIG. 8 is a block diagram for explaining color processing for conventional monochrome printing.

FIG. 7 is a view for indicating the case for producing a red color using the same value of M (magenta) and Y (yellow). For instance, in a case where the value of M (magenta) is same as that of Y (yellow), each color is binarized by the error diffusion process in accordance with the process shown in FIG. 6. Each of the (4L+0)th line, the (4L+1)th line, the (4L+2)th line and the (4L+3)th line of M (magenta) is error diffused from the left to the right, the right to the left, the right to the left and the left to the right, respectively.

Each of the (4L+0)th line, the (4L+1)th line, the (4L+2)th line and the (4L+3)th line of Y (yellow) is error diffused from the right to the left, the right to the left, the left to the right and the left to the right, respectively. Consequently, although dots are superimposed at an odd line, dots are not superimposed at an even line.

Similarly, even if any combination of four colors (two, three or four colors) is used, a plurality of colors are not completely superimposed by performing the error diffusion process indicated in FIG. 6, therefore, the balance of all colors does not confuse. Especially, such effect is demonstrated at a high-light portion using a plurality of colors.

Accordingly, since a pseudo gradation process for one input data is terminated, it becomes possible to execute the pseudo gradation process for an entire image by repeating the above-mentioned process by shifting one pixel.

As mentioned above, according to this embodiment, an image is reproduced using the C, M and Y inks in addition to the K ink in the monochrome printing. Therefore, reproducible gradation number can be increased compared to the case of reproducing the image using only the K ink. As a result, the reproducibility in the monochrome printing can be improved.

The grains phenomenon in the low density portion can be reduced as much as possible. That is, by performing the above-mentioned error diffusion process, since it can preferably be avoided to superimpose dots of each ink, the grains phenomenon can be further suppressed.

A gray image having an excellent gray balance can be reproduced independent of the medium by performing a masking process or a non-linearly type UCR and black generation process which corresponds to the medium.

[Other Embodiments]

In the above-mentioned embodiment, although each data of C, M, Y and K is converted into binary data using the binarization processing unit 160, for instance, each data of C, M and Y may be converted into 4-value data and data of K may be converted into binary data. That is, the binarization processing unit may be a unit for performing a N-value generating process for converting data into N-bits which is lower than the bit number of image data inputted in accordance with the printer 200.

The present invention may be applied to a system composed of a plurality of devices (for instance, a host computer, an interface device, a reader, a printer or the like) or a system composed of one device (for instance, a copying machine or a facsimile apparatus).

The invention employed by a method wherein program codes of a software to realize the functions of the above-described embodiments are supplied to a computer in an apparatus or a system connected to various devices so as to make the devices operative in order to realize the functions of the above-described embodiments and the various devices are operated in accordance with the programs stored in the computer (CPU or MPU) of the system or apparatus is also included in the scope of the present invention.

In such case, the program codes themselves of the software realize the functions of the above-described embodiments and the program codes themselves and means for supplying the program codes to the computer, e.g., a storage medium in which the program codes have been stored, construct the present invention.

As such a memory medium to store the program codes, e.g., it is possible to use a floppy disk, a hard disk, an optical disk, a magneto-optical disk, a CD-ROM, a magnetic tape, a nonvolatile memory card, a ROM or the like.

Also, even in not only a case where the functions of the above-described embodiments are realized by executing the supplied program codes by the computer but also a case where the functions of the above-described embodiment are realized in cooperation with the OS (operating system) by which the program codes operate in the computer or another application software or the like, such program codes are of course included in the scope of the present invention.

Further, of course, the present invention also includes a case where the supplied program codes are stored into a memory provided for a function expansion board of a computer or a function expansion unit connected to a computer and, after data, a CPU or the like provided for the function expansion board or the function expansion unit executes a part or all of the actual processes on the basis of instructions of the program codes, and the functions of the above-described embodiment are realized by the processes.

The present invention has been described in connection with the above preferred embodiments. However, the present invention is not limited only to the above-described embodiment, but various modifications are possible without departing from the scope of the appended claims.

What is claimed is:

1. An image processing method which reproduces a gray image by using plural colors, comprising the steps of:

inputting gray image data;

converting the gray image data into color image data composed of plural color components;

performing a quantization process to each of the plural color components, wherein an error diffusion process is performed to distribute quantization error occurring in said quantization process to peripheral pixels of an objective pixel according to a direction set for each of the plural color components, the directions set for the plural color components including different directions, and the direction set for each of the plural color components changing such that a combination of the color components in the same direction changes in a predetermined line of the image.

2. A method according to claim 1, further comprising a color printing mode of inputting color image data and reproducing the color image data by using the plural colors, wherein said quantization process is performed even when said color printing mode is set.

3. An image processing apparatus which reproduces a gray image by using plural colors, comprising:

input means for inputting gray image data;

conversion means for converting the gray image data into color image data composed of plural color components;

quantization process means for performing a quantization process to each of the plural color components, wherein an error diffusion process is performed to distribute a quantization error occurring in said quantization process to peripheral pixels of an objective pixel according to a direction set for each of the plural color components, the directions set for the plural color components including different directions, and the directions, set for each of the plural color components changing such that a combination of the color components in the same direction changes in a predetermined line of the image.

4. An apparatus according to claim 3, further comprising image formation means for forming an output image based on the color data subjected to said quantization process.

5. A method according to claim 4, wherein said image formation means applies an inkjet recording system.

6. A storage medium which stores a computer-readable program to execute an image processing method for reproducing a gray image by using plural colors, said method comprising the steps of:

inputting gray image data;

converting the gray image data into color image data composed of plural color components;

performing a quantization process to each of the plural color components, wherein an error diffusion process is performed to distribute quantization error occurring in said quantization process to peripheral pixels of an objective pixel according to a direction set for each of the plural color components, the directions set for the plural color components including different directions, and the direction set for each of the plural color components changing such that a combination of the color components in the same direction changes in a predetermined line of the image.

* * * * *

UNITED STATES PATENT AND TRADEMARK OFFICE
CERTIFICATE OF CORRECTION

PATENT NO. : 6,249,354 B1
DATED : June 19, 2001
INVENTOR(S) : Masahiro Nagatani

It is certified that error appears in the above-identified patent and that said Letters Patent is hereby corrected as shown below:

Title page,
Item [57], ABSTRACT,
Line 9, "to" should read -- on --.

Column 3,
Line 3, "become" should read -- became --;
Line 5, "proposal" should read -- proposed --;
Line 11, "proposal" should read -- proposed --;
Line 48, "sub scanning" should read -- sub-scanning --; and
Line 57, "sub scanning" should read -- sub-scanning --.

Column 4,
Line 15, "is" should read -- and is --.

Column 5,
Line 3, "(4L+0)th" should read -- (4L+1)th --;
Line 5, "(4L+0)th" should read -- (4L+1)th --;
Line 7, "(4L+0)th" should read -- (4L+1)th --;
Line 9, "(4L+0)th" should read -- (4L+1)th --; and
Line 18, "(4L+3)th" should read -- (4L+2)th --.

Column 6,
Line 10, "a" (second occurrence) should read -- a --; and
Line 66, "to" should read -- on --.

Column 7,
Line 23, "to" should read -- on --.

UNITED STATES PATENT AND TRADEMARK OFFICE
CERTIFICATE OF CORRECTION

PATENT NO. : 6,249,354 B1
DATED : June 19, 2001
INVENTOR(S) : Masahiro Nagatani

It is certified that error appears in the above-identified patent and that said Letters Patent is hereby corrected as shown below:

Column 8,
Line 1, "directions," should read -- direction --;
Line 16, "to" should read -- on --; and
Line 19, "distribute" should read -- distribute a --.

Signed and Sealed this

Twenty-third Day of April, 2002

Attest:

Attesting Officer

JAMES E. ROGAN
*Director of the United States Patent and Trademark Office*